United States Patent
Yoshimoto

(10) Patent No.: US 9,191,696 B2
(45) Date of Patent: Nov. 17, 2015

(54) RECEPTION DEVICE AND PROGRAM FOR RECEPTION DEVICE

(71) Applicant: SAMSUNG ELECTRONICS CO., LTD., Suwon-si (KR)

(72) Inventor: Morio Yoshimoto, Minoh (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/918,355

(22) Filed: Jun. 14, 2013

(65) Prior Publication Data

US 2013/0340023 A1 Dec. 19, 2013

(30) Foreign Application Priority Data

Jun. 15, 2012 (JP) .................................. 2012-135813
May 27, 2013 (KR) ......................... 10-2013-0059933

(51) Int. Cl.
| | |
|---|---|
| *H04N 7/173* | (2011.01) |
| *H04N 21/434* | (2011.01) |
| *H04N 21/6375* | (2011.01) |

(52) U.S. Cl.
CPC ....... *H04N 21/4343* (2013.01); *H04N 21/6375* (2013.01)

(58) Field of Classification Search
CPC .............................. H04N 21/63; H04N 21/64
USPC ................................... 725/116, 54
See application file for complete search history.

(56) References Cited

U.S. PATENT DOCUMENTS

| | | | |
|---|---|---|---|
| 6,249,681 B1 * | 6/2001 | Virtanen ........................ 455/466 |
| 6,496,217 B1 * | 12/2002 | Piotrowski ................. 348/14.12 |
| 7,502,818 B2 | 3/2009 | Kohno et al. |
| 7,953,880 B2 * | 5/2011 | Deshpande .................... 709/231 |
| 2003/0067872 A1 * | 4/2003 | Harrell et al. .................. 370/229 |
| 2003/0108033 A1 * | 6/2003 | Raisanen et al. .............. 370/352 |
| 2003/0179825 A1 * | 9/2003 | Sekiguchi et al. ......... 375/240.1 |
| 2004/0027991 A1 * | 2/2004 | Jang et al. ..................... 370/230 |
| 2008/0130658 A1 * | 6/2008 | Chakareski et al. ..... 370/395.42 |
| 2008/0158339 A1 * | 7/2008 | Civanlar et al. ............ 348/14.09 |
| 2009/0022157 A1 * | 1/2009 | Rumbaugh et al. ........... 370/394 |

FOREIGN PATENT DOCUMENTS

| | | |
|---|---|---|
| JP | 9307510 A | 11/1997 |
| JP | 3757857 B2 | 1/2006 |

* cited by examiner

*Primary Examiner* — Benjamin R Bruckart
*Assistant Examiner* — Tien M Nguyen
(74) *Attorney, Agent, or Firm* — Sughrue Mion, PLLC

(57) ABSTRACT

A reception device and program for the reception device that uses a scalable video coding (SVC) method to ensure best-effort image data transmission even when stream-type data is transmitted through a transmission control protocol (TCP). The reception device includes a frame detecting unit configured to detect a base layer reception completed time point indicating a time at which a base layer of a frame to be reproduced is formed using the received image packet, a timer unit configured to detect an expiration of a timeout period beginning at the earliest from the base layer reception completed time point, and a reception completed packet processing unit configured to transmit a reception completed packet to the transmission device, the reception completed packet indicating that at least one transmitted image packet is not received after the expiration of the timeout period detected by the timer unit.

16 Claims, 7 Drawing Sheets

RECEPTION DEVICE AND PROGRAM FOR RECEPTION DEVICE

CROSS-REFERENCE TO RELATED PATENT APPLICATION

This application claims priority from Japanese Patent Application No. 2012-135813, filed on Jun. 15, 2012, in the Japan Intellectual Property Office, and Korean Patent Application No. 10-2013-0059933, filed on May 27, 2013, in the Korean Intellectual Property Office, the disclosures of which are incorporated herein by reference in their entireties.

BACKGROUND

1. Field

Devices and methods consistent with exemplary embodiments relates to a data reception device that receives transmitted image packets transmitted from a transmission device in a data transmitting system, which transmits image data in a stream-type data, and a program used in the data transmitting system.

2. Description of the Related Art

When image data is transmitted via the Internet, a stream-type transmitting method is often used in contrast to a download-type transmitting method. The stream-type transmitting method is a method that may transmit the image data from a transmission device to a reception device that then reproduces the image data in a perceived simultaneous manner to a user.

The image data that has been coded using a scalable video coding (SVC) method may be used when the stream-type transmitting method is executed, to transmit the image data depending on the circuit status or ability of a receiving end.

An extension of the H.264 video coding standards is an example of the SVC method. As shown in FIG. 6, the data structure of the coding may be divided into a base layer, which is formed with the minimum moving image elements needed, and an extended layer which is combined with the base layer to thereby increase image quality.

The base layer is a highly-reliable channel because the base layer is an essential data stream for reproducing an image on the receiving end. The base layer is transmitted and received with high reliability using redundancy checks such as forward error correction (FEC).

On the other hand, the extended layer, which is a less-reliable channel, is divided into a space layer for increasing accuracy of an image, a time layer for increasing frame rates of a moving image, and a signal to noise (S/N) ratio layer for increasing S/N ratios of an image.

The extended layer may not be processed using redundancy checks such as FEC. Further, when the circuit status becomes undesirable, the extended layer may not be transmitted to the reception device. Because the essential base layer is always transmitted to the reception device, the extended layer that is transmitted from the transmission device without errors and the base layer may be combined and decoded, to obtain a transmitted image result that is suitable for the circuit status.

However, according to Japanese Patent No. 3757857, when image data coded using the SVC method (hereinafter, referred to as "SVC image data") is transmitted, a real time protocol (RTP) is used as a transfer protocol, which does not retransmit data. Therefore, the SVC image data may be transmitted having more priority in real-time data transmission rather than priority in reliability of data transmission.

Also, a data transmission system according to Japanese Patent No. 3757857 uses RTP, which does not retransmit data in principle, as a transfer protocol, but rather retransmits a portion of layers.

However, even when streaming moving images and the like, a transmission control protocol (TCP), which maintains reliable transmission by retransmitting data, may be used as a transfer protocol. When transmitting SVC image data through TCP, if a transmitted image packet that failed to be transmitted to the reception device exists, then, all of the non-transmitted image packets are retransmitted. Thus, when transmitting SVC image data through TCP, even if the purpose of data transmission is only to reproduce moving images, transmitted image packets of the extended layers that do not necessarily have to be transmitted to the reception device are still completely retransmitted. Therefore, even though picture quality of moving images may be fixed at best quality, the real-time feature is degraded because of the delay caused during the receiving of every transmitted image packet.

That is, simply by combining TCP and the SVC method, various picture qualities that depend on the circuit status may not be automatically obtained, and the same best-effort image result as using a combination of RTP and the SVC method may not be obtained. Accordingly, because features of the SVC method may not be implemented, data may be encoded in various bit rates depending on the circuit status as in other related technology, or a plurality of encoded moving image data may be provided.

Also, in a data transmission system according to Japanese Patent No. 9-307510, assuming that a transmission device repeatedly retransmits image packets until the transmitted image packets are received as reception completed packets at a reception device, the data transmission system includes features that only use the reception device to ensure that a base layer is received in the reception device, and at the same time, does not retransmit image packets for other non-received extended layers.

Specifically, the reception device may not transmit the reception completed packet for a non-received base layer to the transmission device. At the same time, even when extended layers are not actually received, the reception completed packets for non-received extended layers may be transmitted to the transmission device, causing a forced stop of the retransmission process regarding the non-received extended layer.

Further, in such a reception device, if there is even one transmitted image packet of the extended layers that could not be received in the reception device, then, the retransmission of the extended layers is stopped. Therefore, if the circuit status is undesirable, the extended layers are almost not decoded at all, and only the base layer is transmitted.

In other words, regardless of the circuit status, even if there is a need to provide a minimum protection of the base layer and first-priority extended layer to reproduce a moving image, because the first-priority extended layer cannot be protected, the transmission device may not be able to provide best-effort image data transmission that reflects the user preferences regarding picture quality.

SUMMARY

One or more exemplary embodiments provide a data reception device that uses a scalable video coding (SVC) method that ensures best-effort image data transmission even when stream-type data is transmitted through a transmission control protocol (TCP), and simultaneously enable real-time data transmission, and protects a portion of extended layers other than a base layer; and a program used in the data transmitting system. In other words, even if a transmission device such as servers can retransmit, but cannot set which layer to retransmit, the exemplary embodiments may provide best-effort image data transmission while protecting the base layer and a portion of the extended layer, using only a reception device which is a client.

According to an aspect of an exemplary embodiment, there is provided a data transmitting system configured to transmit image data as stream-type data, the data transmission system including a reception device configured to receive a transmitted image packet transmitted from a transmission device, in which the transmission device includes an image data storing unit configured to store coded image data formed of a base layer, extended layers, and layer data representing layers of the coded image data; a transmitting unit configured to generate the transmitted image packet including the coded image data and corresponding layer data, and configured to transmit the generated image packet to the reception device; and a retransmitting unit configured to receive, from the reception device, a reception completed packet that indicates the corresponding transmitted image packet was received in the reception device, and configured to retransmit the image packet for which the corresponding reception completed packet was not received.

The reception device may include a reception completed packet processing unit configured to transmit the reception completed packet to the transmission device; a receiving unit configured to receive the transmitted image packet and sequence numbers from the transmission device, a layer identifying unit configured to identify layers of the transmitted image packet received by the receiving unit, based on the layer data; a frame detecting unit configured to detect a base layer reception completed time point, indicating a time at which a base layer of a frame to be reproduced is formed using the received image packet; and a timer unit configured to detect expiration of a timeout period beginning, at the earliest from the base layer reception completed time point; in which the reception completed packet for the transmitted image packet that is not received is transmitted to the transmission device after the reception completed processing unit is informed of the expiration of the timeout period from the timer unit.

According to an aspect of an exemplary embodiment, after the reception completed processing unit is informed of the expiration of the timeout period from the timer unit, then, the reception completed processing unit may be configured to transmit the reception completed packet for the image packet that where not received to the transmission device. Therefore, even when using transfer protocols such as TCP, which may include retransmission process, to transmit data, and under undesirable circuit status, at least the base layer is completely received by retransmitting, and at the same time, retransmission of other extended layers may be stopped.

According to an aspect of an exemplary embodiment, the retransmission of other extended layers occurs after the base layer reception completed time point and the expiration of the timeout period. Therefore, at least until the end of the timeout period, non-received extended layers may be retransmitted and thus protected.

That is, according to an aspect of the reception device according to an exemplary embodiment may not uniformly transmit reception completed packets for the extended layers that are not received in order to stop the retransmission process in the transmission device. The reception device according to an exemplary embodiment may protect a portion of the extended layers by providing a certain delay period named "timeout period."

According to an aspect of an exemplary embodiment, when the circuit status is desirable, all the extended layers may be received in the reception device, and moving images may be reproduced in best quality.

According to an aspect of an exemplary embodiment, even if there may be known feature in the transmission device and using transfer protocols such as TCP, which includes retransmission process, to transmit data, moving images may be reproduced based on the circuit status and thus best-effort image data transmission may be provided by only using the features of the reception device. Also, best-effort image data transmission may reflect a user requirement regarding picture quality, for example, the user requirement may be to protect not only the base layer, but also a portion of the extended layers.

According to an aspect of an exemplary embodiment, to protect a portion of the extended layers in a similar manner as the base layer, and reproduce moving images in real-time, the expiration of the timeout period may appear before a reproducing timing of a frame that is to be reproduced.

According to an aspect of an exemplary embodiment, to protect a portion of the extended layers as the first-priority extended layer and ensure that the first-priority layer is completely received, the reception device may further include a first-priority extended layer setting unit configured to set the first-priority extended layer to be retransmitted; in which the frame detecting unit is further configured to detect the base layer reception completed time point, and a first-priority extended layer reception completed time point, indicating when the first-priority extended layer is formed; in which the timer unit is further configured to inform the reception completed packet processing unit of the expiration of the timeout period, where the timeout period is configured to begin from a later of the base layer reception completed time point and the first-priority extended layer reception completed time point. Then, the base layer and first-priority extended layer may be protected by the retransmission process and received in the reception device. At the same time, extended layers, which are not received when the timeout period is finished, may be stopped from being retransmitted, and thus, moving images may be reproduced based on the circuit status.

According to an aspect of an exemplary embodiment, to detect whether the base layer or first-priority extended layer are completely received without receiving a certain data from the transmission device and by only using the reception, the frame detecting unit may be configured to temporarily decode at least one of the base layer or first-priority extended layer by using the transmitted image packet received in the receiving unit, and set a success time point of the temporary decoding as at least one of the base layer reception completed time point and a first-priority extended layer reception completed time point.

According to an aspect of an exemplary embodiment, even if the transmission device does not transmit detailed lists of the transmitted image packets to the reception device, it may be possible to use only the reception device to stop retransmitting data from the base layer and first-priority extended layer, by having the reception completed packet processing unit configured to transmit a dummy reception completed packet of the transmitted packet that where not received, and that has a lower sequence number than highest sequence numbers of the received transmitted image packets, to the transmission device, at a late of the base layer reception completed time point and a first-priority extended layer reception completed time point.

According to an aspect of an exemplary embodiment, to add the feature of the reception device a reception device, and obtain best-effort image data transmission when reproducing moving images, a program for the reception device may be installed in the reception device. The reception device of the program includes a reception completed packet processing unit configured to transmit the reception completed packet to the transmission device; a receiving unit configured to receive the transmitted image packet and sequence numbers from the transmission device; a layer identifying unit configured to identify layers of the transmitted image packet received by the receiving unit, based on the layer data; a frame detecting unit configured to detect a base layer reception completed time point, indicating a time at which a base layer of a frame to be reproduced is received using the received image packet; and a timer unit configured to detect expiration of a timeout period beginning, at the earliest, from the base layer reception completed time point, were the reception completed packet for the transmitted image packet that is not received is transmitted to the transmission device after the reception completed processing unit is informed of the expiration of the timeout period from the timer unit.

BRIEF DESCRIPTION OF THE DRAWINGS

The above and other aspects will become more apparent by describing certain exemplary embodiments with reference to the attached drawings in which.

DETAILED DESCRIPTION OF EXEMPLARY EMBODIMENTS

Certain exemplary embodiments will be described with reference to the attached drawings.

In exemplary embodiments, numerous specific details are set forth in order to provide a more thorough understanding. However, it will be apparent to one with ordinary skill in the art that the exemplary embodiments may be practiced without these specific details. In other instances, well-known features have not been described in detail to avoid obscuring the exemplary embodiments.

A reception device 100 according to an exemplary embodiment forms a pair with a transmission device 101 to compose a data transmitting system 102 for transmitting image data as a stream-type data.

Figure 1:
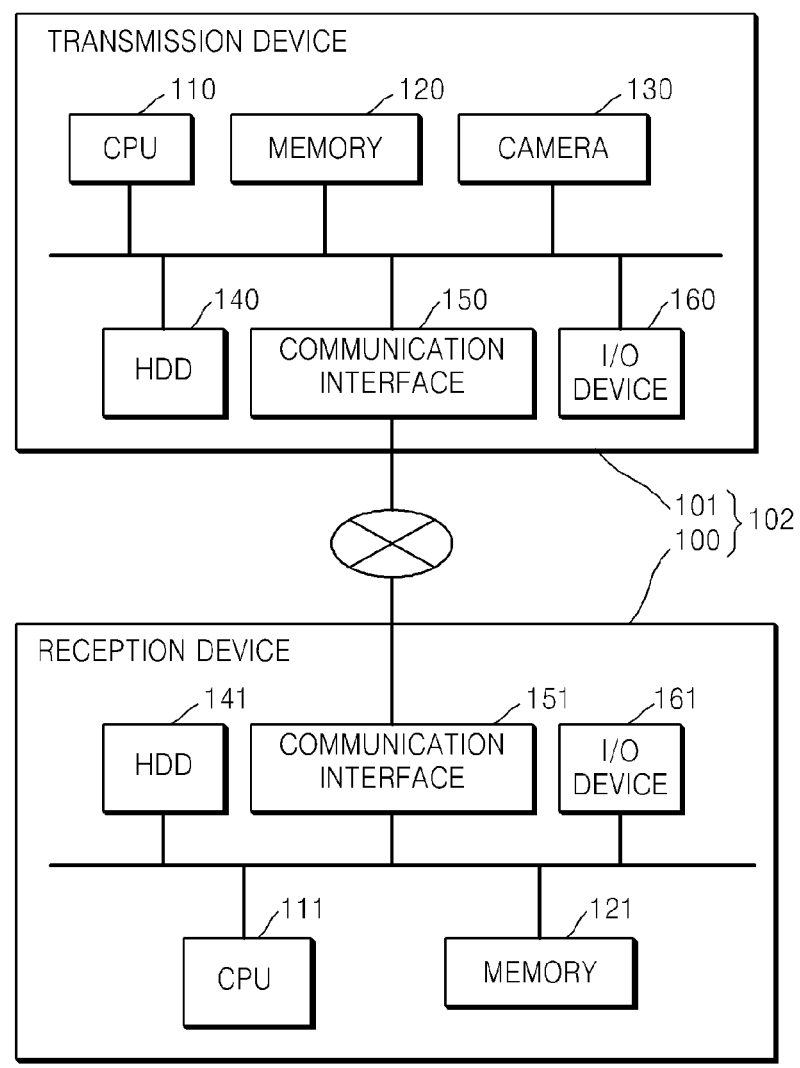
FIG. 1 is a schematic diagram of a data transmitting system in accordance with an exemplary embodiment.

As shown in FIG. 1, the transmission device 101 and reception device 100 may be a computer, or other electronic device. Specifically, the transmission device 101 may be a computer including a CPU 110, a memory 120, a HDD 140 or a flash memory (not shown), a communication interface (I/F) 150, and an input-output (I/O) device 160. Similarly, the reception device 100 may be a computer including a CPU 111, a memory 121, a HDD 141 or a flash memory (not shown), a communication interface (I/F) 151, and an input-output (I/O) device 161. The CPUs 110 and 111 function in various ways in the respective computer by executing programs stored in the corresponding memory elements 120 and 121. Also, the transmission device 101 and reception device 100 transfer information using networks such as the Internet, and may use transmission control protocol (TCP) as a transfer protocol instead of real time protocol (RTP).

Figure 2:
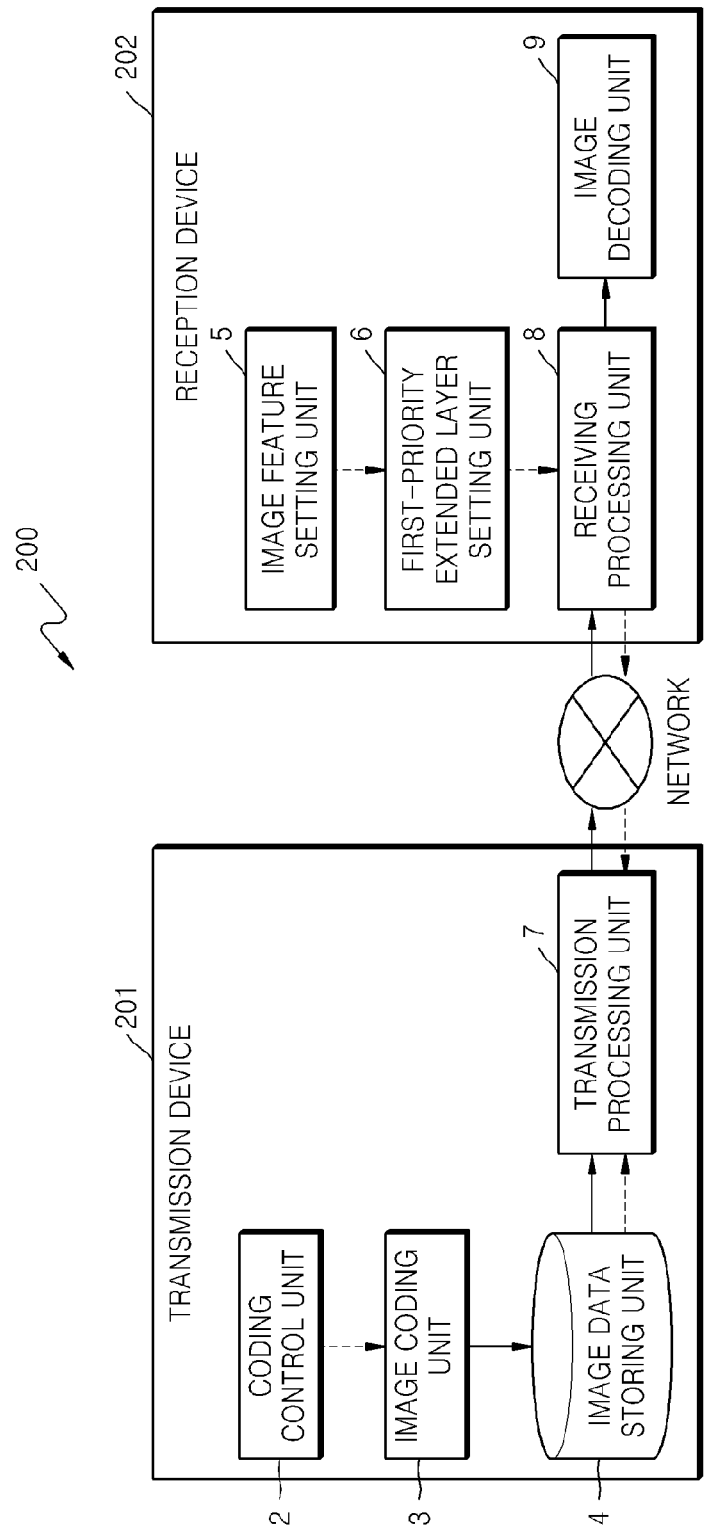
FIG. 2 is a block diagram of a data transmitting system in accordance with an exemplary embodiment.

The transmission device 101 may further include a camera 130 for photographing. The transmission device 101 codes a photographed image data using a scalable video coding (SVC) method, and transfers the image data coded using the SVC method (hereinafter, referred to as "SVC image data") to the reception device 100. Further, in accordance with one or more exemplary embodiments, as shown in FIG. 2, the transmission device 201 may at least include an image coding unit 3, a coding control unit 2, an image data storing unit 4, and a transmission processing unit 7. Additionally the reception device 202 may at least include an image feature setting unit 5, a first-priority extended layer setting unit 6, a receiving processing unit 8, and an image decoding unit.

In another exemplary embodiment, the reception device 202 determines whether to retransmit a transmitted image packet from the transmission device 201 that is not normally received or has errors therein. Then, if the transmitted image packet needs to be retransmitted, the reception device 202 retransmits the transmitted image packet, decodes SVC image data, and reproduces a moving image. That is done by, as shown in FIG. 2, the reception device 202 that may at least include the image feature setting unit 5, the first-priority extended layer setting unit 6, a reception processing unit 8, and an image decoding unit 9.

Hereinafter, one or more exemplary embodiments of a transmission device 101 or 201, a reception device 100 or 202, a process of coding an image data using the SVC method, and the operation of a packet transceiving process will be described.

First, in accordance with one or more exemplary embodiments, a transmission device 201 will be further described.

Particularly, according an exemplary embodiment, the image coding unit 3 codes image data photographed using the camera 130, using coding such as SVC which may be an extension of the H.264 video coding standards. Further, the image coding unit 3 codes image data into SVC image data that is formed of a base layer, which includes the minimum moving image elements for image reproduction, and an extended layer, which is combined with the base layer to increase image quality.

In accordance with an exemplary embodiment, the coding control unit 2 may control a process for determining how many types of sub-layers to divide a layer into, and may control coding the image data using the SVC method by using the image coding unit 3. According to an exemplary embodiment, the coding control unit 2 may also divide the extended layer into three types of layers, that is, a space layer for increasing accuracy of an image, a time layer for increasing frame rate of a moving image, and an S/N ratio layer for increasing a signal to noise (S/N) ratio of an image. Additionally, the coding control unit 2 may also combine the base layer and the divided extended layers and decode the combined layers, and thus, a moving image of a desirable picture quality may be provided.

In accordance with an exemplary embodiment, the image data storing unit 4 may store coded image data which includes a base layer and an expanded layer, and layer data which represents layers of the coded image data. The image data is coded in the image coding unit 3.

The transmission processing unit 7 transmits a coded image data packet to the reception device 202, and at effectively the same time, retransmits all transmitted image packets that did not receive the reception completed packet from the reception device 202.

Figure 3:
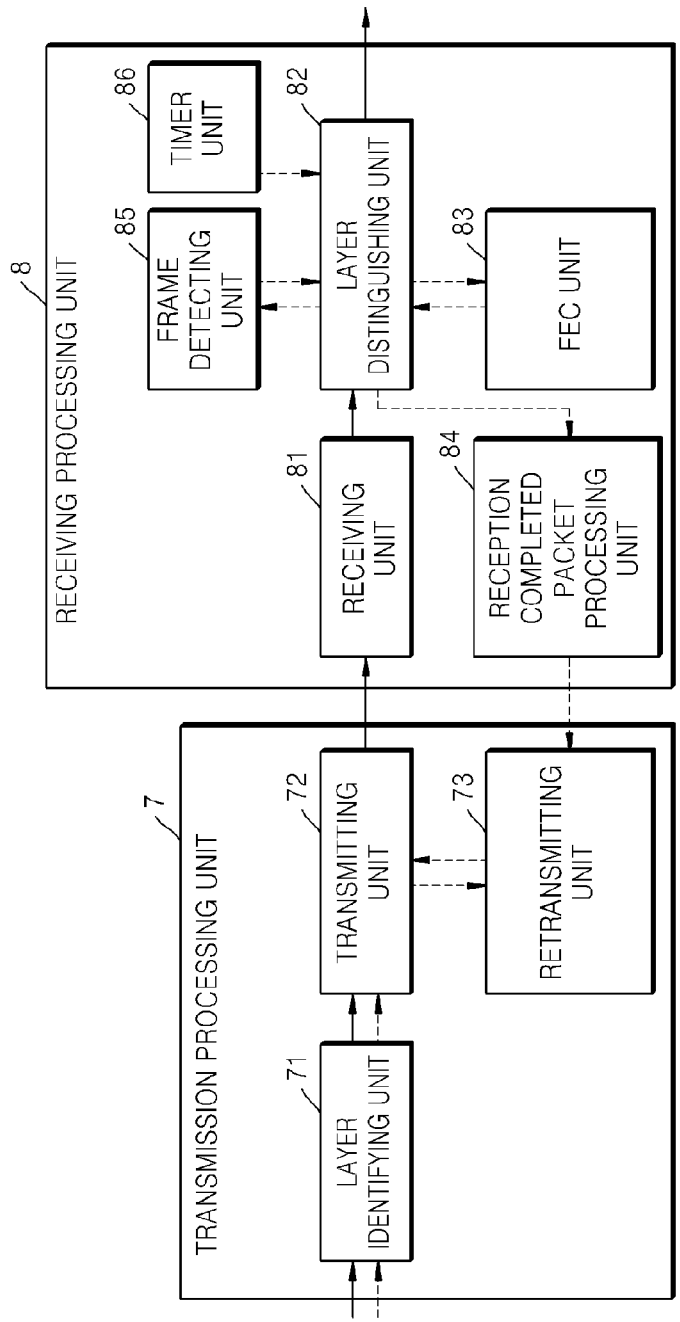
FIG. 3 is a block diagram of a transmission processing unit and a receiving processing unit in accordance with an exemplary embodiment.

Furthermore, in accordance with an exemplary embodiment, as illustrated in FIG. 3, the transmission processing unit 7 may include a layer identifying unit 71, a transmitting unit 72, and a retransmitting unit 73.

The layer identifying unit 71 may receive the coded image data and layer data that correspond to the layers of coded image data from the image data storing unit 4. Then, the layer identifying unit 71 may identify the layer of the received coded image data based on the received layer data.

In accordance with an exemplary embodiment, the transmitting unit 72 may generate a transmitted image packet which stores all the layer data corresponding to SVC image data identified in the layer identifying unit 71. Then the transmitting unit 72 may transmit the generated image packet to the reception device 202. Also, the transmitting unit 72 stores sequence information in the retransmitting unit 73 based on the layer identification performed by the layer identifying unit 71. The sequence information may include information regarding which portion of the packet transmission sequence is the transmitted image packet including the base layer, the time layer, the space layer, or the S/N ratio layer.

In accordance with an exemplary embodiment, the retransmitting unit 73 receives a reception completed packet from the reception device 202. The reception completed packet is a transmitted image packet received from the reception device 202. If the transmission unit transmits an image packet to the reception device 202, but the transmitted image packet is not received, and thus a reception completed packet from the reception device 202 within a predetermined time is not received, then, the retransmitting unit 73 retransmits a transmitted image packet to the transmitting unit 72.

Particularly, the transmission device 201 retransmits all transmitted image packets that did not receive the reception completed packet from the reception processing unit 8. Further, the transmission device 201 may not have a feature that stops retransmission of extended layers other than the base layer and first-priority extended layer.

Next, the reception device 202 will be described in detail in accordance with one or more exemplary embodiments. As shown in FIG. 2, the reception device 202 includes the image feature setting unit 5, the first-priority extended layer setting unit 6, the reception processing unit 8, and the image decoding unit 9.

In accordance with an exemplary embodiment, the image feature setting unit 5 identifies motion intensity of content images recorded in the image data based on motion vector information when an image data is SVC coded using the image coding unit 3. Then the image feature setting unit 5 sets an image data feature. Also, the image feature setting unit 5 sets an image feature based on the feature of the content images stored in the metadata of the image data. For example, if the feature of the content images is sports, the image feature setting unit 5 identifies the motion of the content images as having intense motion. Further, if the amount of high-frequency units is above a predetermined level when coding an image data using SVC, the image feature setting unit 5 identifies the content images as detailed content images.

In accordance with an exemplary embodiment, the first-priority extended layer setting unit 6 may determine whether the time layer, space layer, or S/N ratio layer is the first-priority extended layer based on the motion intensity, amount of noise, and resolution of content images identified in the image feature setting unit 5. Alternatively, the first-priority extended layer setting unit 6 may determine which extended layer to retransmit or execute forward error correction (FEC) first based on the motion intensity, amount of noise, and resolution of content images identified in the image feature setting unit 5.

For example, in accordance with an exemplary embodiment, if the feature of content images is identified as having intense motion, the first-priority extended layer setting unit 6 may set the time layer as the first-priority extended layer to maintain a frame rate above a predetermined level when reproducing a moving image. Also, for a moving image with other features, such as a high-resolution content images where the motion thereof is not as intense as that of the content images described above while including much detail, the first-priority extended layer setting unit 6 may set the space layer as the first-priority extended layer. Also, if content images include ample noise, the S/N ratio layer is set as the first-priority extended layer.

As illustrated in FIG. 3, and in accordance with an exemplary embodiment, the receiving processing unit 8 includes a receiving unit 81, a layer distinguishing unit 82, an FEC unit 83, the reception completed packet processing unit 84, a frame detecting unit 85, and a timer unit 86. The receiving processing unit 8 may receive an image packet transmitted from the transmission device 101 or 201. Among the transmitted image packets in which a portion thereof may not be transmitted due to the circuit status, or is broken and thus unrecoverable, the receiving processing unit 8 only retransmits the transmitted image packets of a base layer, and transmitted image packets of an extended layer, set as a first-priority extended layer. Also, the image decoding unit 9 decodes by using all layers that may be used based on the received image packet from the reception processing unit 8 and the transmitted image packet that is recovered in the FEC unit 83. The data received from the receiving unit 81 may at least include the base layer and first-priority extended layer. Further, the base layer and first-priority extended layer may be combined and then decoded. For example, if the circuit status is desirable, the image decoding unit 9 may combine data of the extended layers, other than the first-priority extended layer, and then decode the combined data. Accordingly, higher quality moving images may be reproduced.

In accordance with an exemplary embodiment, the receiving unit 81 may receive sequence numbers and received image packets from the transmitting unit 72.

Based on layer data, the layer identifying unit 71 may identify a layer of coded image data stored in the transmitted image packet received in the receiving unit 81 based on the layer data. If the transmitted image packet received in the layer identifying unit 71 has errors or omission, the FEC unit 83 may execute FEC thereto. Then, the recovered coded image data is transmitted to the image decoding unit 9 to reproduce a moving image.

In accordance with an exemplary embodiment, the reception completed packet processing unit 84 may transmit a reception completed packet, which is a transmitted image packet received in the receiving unit 81, to the transmission device 201, so that the retransmitting unit 73 avoids retransmission of any received packets. In accordance with an exemplary embodiment, if a transmitted image packet has errors that are not corrected using the FEC unit 83, then the reception completed packet processing unit 84 may not transmit the reception completed packet to the transmission device 201, so that the retransmitting unit 73 will start retransmitting the transmitted image packet that was received with uncorrectable errors. Also, in accordance with an exemplary embodiment, the reception completed packet processing unit 84 may transmits a dummy reception completed packet to the transmission device 201, in order to stop retransmission of a non-received transmission image packet according to operations of a frame detecting unit 85 and a timer unit 86 in the situation when, although not received, that specific packet is no longer needed to generate the moving image.

In accordance with an exemplary embodiment, during a period before a reproducing timing of a frame arrives, the frame detecting unit 85 may detect a base layer reception completed time point, which may be a time point when a base layer of the frame that is to be reproduced is set using the transmitted image packet that is received in the receiving unit 81. Further, during the period before a reproducing timing of a frame arrives, the frame detecting unit 85 may also detect a first-priority extended layer reception completed time point, which is a time point when a first-priority extended layer of the frame that is to be reproduced, is set.

In accordance with an exemplary embodiment, in the event that such time points are detected, the frame detecting unit 85 may temporarily decode the base layer and first-priority extended layer using the transmitted image packet that is received in the receiving unit 81, and may detect the base layer reception completed time point, and first-priority extended layer reception completed time point based on the timing when the temporary decoding, is successfully finished.

Starting from the later time point between the base layer reception completed time point and first-priority extended layer reception completed time point, the timer unit 86 counts a timeout period. Then, when the timeout period is finished, the timer unit 86 informs the reception completed packet processing unit 84 that the timeout period is finished.

After being informed from the timer unit 86 that timeout period is finished, the reception completed packet processing unit 84 may transmit a dummy reception completed packet to stop the transmission device 201 from retransmitting the non-received transmitted image packet. Then, the reception completed packet processing unit 84 may transmit the reception completed packet for the non-received transmitted image packet, which has a lower sequence number than the highest number of sequence numbers of the received transmitted image packets, to the transmission device 201.

Thus, in accordance with an exemplary embodiment, if the reproducing timing of the frame that is to be reproduced from extended layers other than a base layer and first-priority extended layer (hereinafter, referred to as "other extended layers") could not be received, the transmission device 201 stops the retransmission process of image packets to maintain real-time reproduction of a moving image. Also, because the reception completed packet processing unit 84 stops retransmission process according to the operations of the frame detecting unit 85 and timer unit 86, the reception device 202 may receive and use the image packets of the protected base layer and first-priority extended layer to reproduce moving images. In addition, during the period from the later time point between the base layer reception completed time point and first-priority extended layer reception completed time point to the timeout period, the other extended layers may not receive the reception completed packets. Therefore, the transmission device 201 may continue retransmission. Thus, according to the circuit status, the other extended layers may be formed and used to reproduce moving images. Alternatively, the transmitted image packets may also not be formed until the timeout period, causing the retransmission to stop, and thus the other extended layers may not be used to reproduce moving images. Accordingly, using the protected base and first-priority extended layers, the user-preferred or the minimum picture quality in the moving image setting may be maintained. At the same time, the other extended layers may be used according to the circuit status, thus providing best-effort image data transmission.

Hereinafter, in accordance with an exemplary embodiment, operations relating to the receiving of the transmitted image packets of the frame that is to be reproduced at the reception device 202, will be described.

Figure 4A:
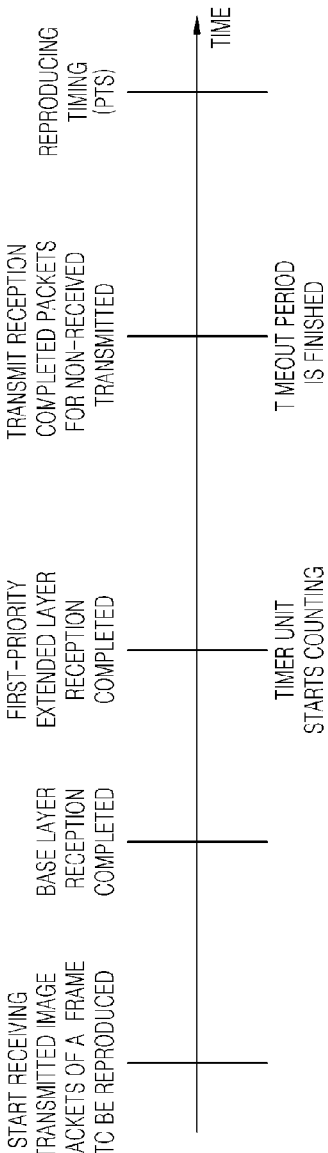
FIGS. 4A and 4B are timeline graphs illustrating operations of a timer unit in accordance with one or more exemplary embodiments.

First, as shown in FIG. 4A, and in accordance with an exemplary embodiment, processes in which a base frame is formed first, and then a first-priority extended layer is formed, will be described in detail which occur before the reproducing timing of the frame that is to be reproduced. Before the timeout period and before the reproducing timing is finished, the reception completed packet processing unit 84 may only transmit the reception completed packet of the transmitted image packet that is actually received, to the transmission device 201. Therefore, the transmitted image packet, which is not received until the timeout period is finished, is automatically retransmitted from the transmission device 201.

Figure 4B:
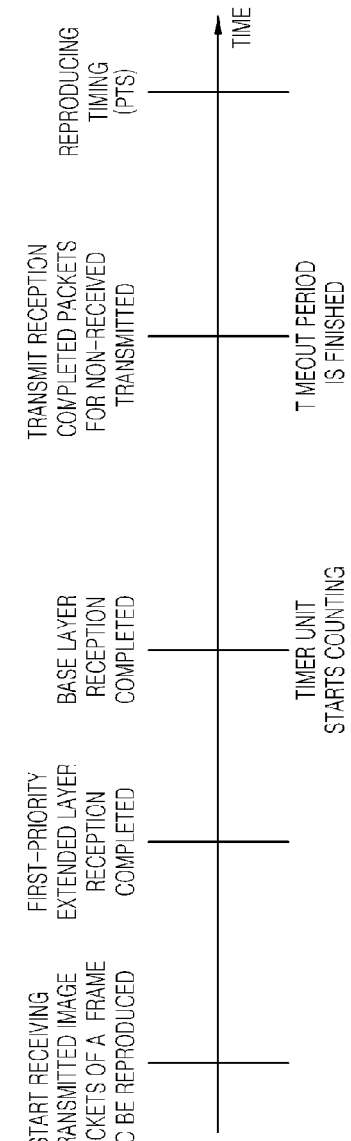

Alternatively, as shown in FIG. 4B, and in accordance with an exemplary embodiment, processes may provide a base frame being formed second, and a first-priority extended layer being formed first, which occurs before the reproducing timing of the frame that is to be reproduced.

Figure 5A:
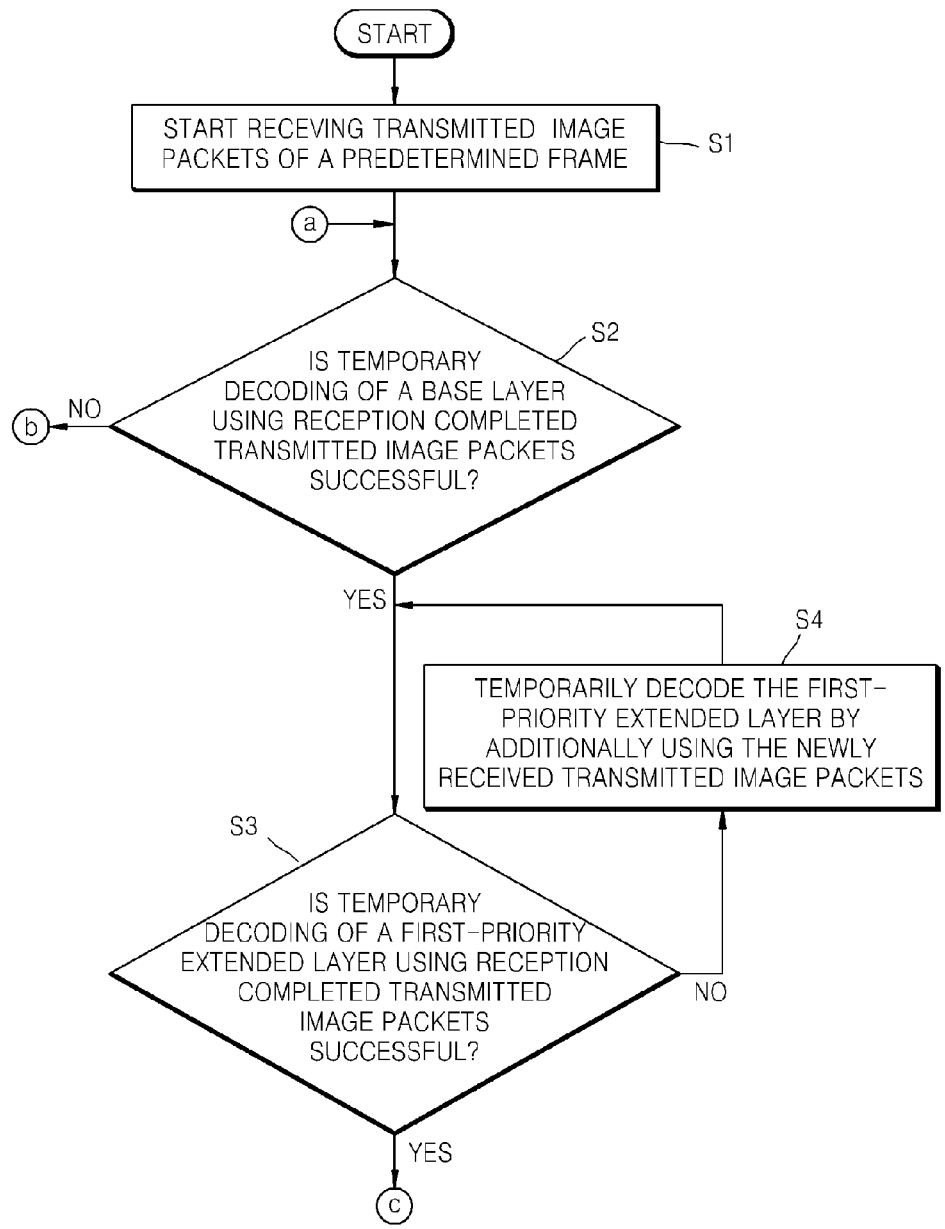
FIGS. 5A and 5B are flowcharts of operations of a reception device in accordance with one or more exemplary embodiments.
Figure 5B:
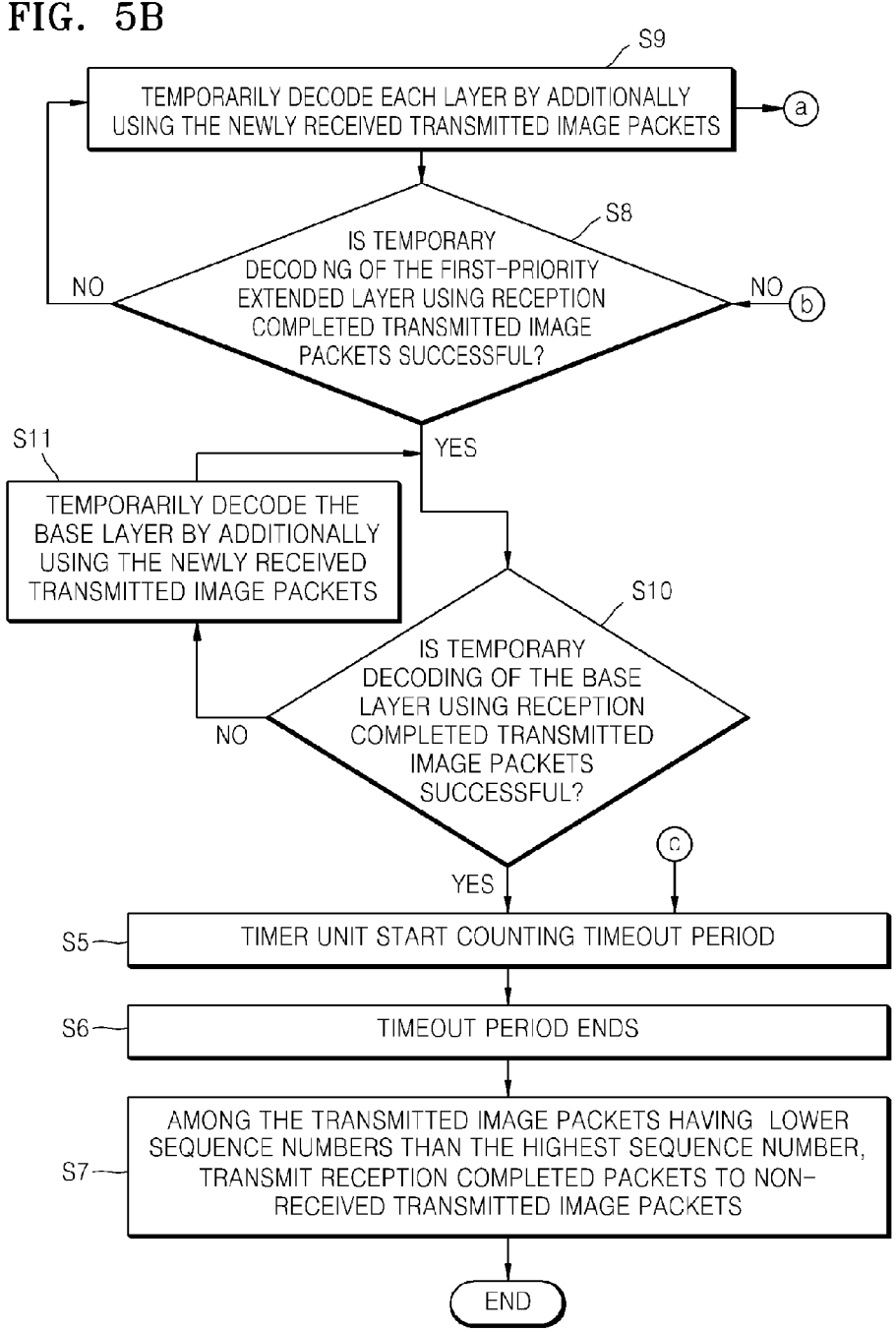
Figure 6:
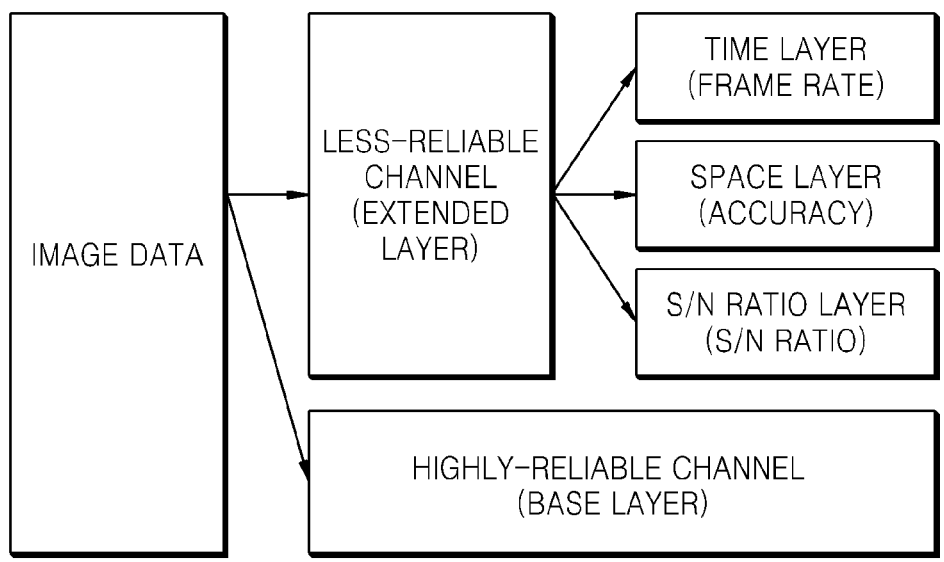
FIG. 6 is a schematic diagram of a structure of an image data coded using scalable video coding (SVC) method.

As shown in the flowchart of FIGS. 5A and 5B, and in accordance with an exemplary embodiment, when the receiving unit 81 starts receiving the transmitted image packet of a frame that is to be reproduced (operation S1), the frame detecting unit 85 may already be receiving the transmitted image packet. Then, the layer identifying unit 82 may use the transmitted image packets that are identified as that of the base layer, and attempts to determine if temporary decoding of the transmitted image packets is successful (operation S2).

When the receiving unit 81 is successful in temporarily decoding the base layer using the transmitted image packets already received, the frame detecting unit 85 may detect the temporary decoding success time point as the base layer reception completed time point.

Also, the frame detecting unit 85 attempts to temporarily decode the first-priority extended layer, by using all of the transmitted image packets that are already being received in the receiving unit 81 and are being identified as the first-priority extended layer in the layer identifying unit 82 (operation S3).

If the temporary decoding is unsuccessful, the frame detecting unit 85 temporarily decodes the first-priority extended layer by using the newly transmitted image packets that are newly received through retransmission (operation S4).

The frame detecting unit 85 may detect the time point when the first-priority extended layer is successfully temporarily decoded as the first-priority extended layer reception completed time point. The timer unit 86 may start counting the timeout period from the first-priority extended layer reception completed time point (operation S5).

When a timeout period is finished from the first-priority extended layer reception completed time point, the timer unit 86 informs the reception completed packet processing unit 84 that the timeout period is finished (operation S6). Then, the reception completed packet processing unit 84 may transmit to the transmission device 201 a dummy reception completed packet for the non-received transmitted packet, which may have a lower sequence number than the highest sequence numbers of the received transmitted image packets (operation S7).

Next, as shown in FIG. 4B, and in accordance with an exemplary embodiment, processes that occur prior to the reproducing timing of the frame that is to be reproduced, in which a first-priority extended layer is formed first, and then a base layer is formed, are illustrated and described.

As shown in the flowchart of FIG. 5B, when the receiving unit 81 is successful in temporarily decoding the first-priority extended layer using the transmitted image packets already received, the frame detecting unit 85 detects the temporary decoding success time point as the first-priority extended layer reception completed time point (operation S8). Also, if temporary decoding of all of the base layer and first-priority extended layer is unsuccessful, the frame detecting unit 85 again attempts to temporarily decode each layer (operation S9).

Also, the frame detecting unit 85 attempts to temporarily decode the base layer, by using all of the transmitted image packets that are already being received in the receiving unit 81 and are being identified as the base layer in the layer identifying unit 82 (operation S10).

If the temporary decoding is unsuccessful, the frame detecting unit 85 may temporarily decode the base layer by using the newly transmitted image packets that are newly received through retransmission (operation S11).

The frame detecting unit 85 detects the time point when the base layer is successfully temporarily decoded as the base layer reception completed time point. The timer unit 86 starts counting the timeout period from the base layer reception completed time point (operation S5).

When a timeout period is finished that began from the base layer reception completed time point, the timer unit 86 informs the reception completed packet processing unit 84 that the timeout period is finished (operation S6). Then, the reception completed packet processing unit 84 transmits, to the transmission device 201, a dummy reception completed packet for the non-received transmitted packet, which has a lower sequence number than the highest sequence numbers of the received transmitted image packets (operation S7).

In accordance with an exemplary embodiment, following the processes described above, regardless of the order of layer reception completion, in forming at least the base layer and first-priority extended layer, the reception device 202 may transmit the dummy reception completed packets for the non-received extended layers. That is, even if the retransmission process of the transmission device 201 is forced to stop due to the dummy reception completed packet, the base layer and first-priority extended layer may always be received. Therefore, moving images may be reproduced in a desirable picture quality, and real-time reproduction is possible.

Also, the other extended layers are continuously retransmitted during the ending of the timeout period. Therefore, depending on the circuit status, the reproducing timing of the frame to be reproduced may be set and even an enhancement of picture quality may be expected.

In other words, when the circuit status is desirable, the reception device 100 or 202, according to an exemplary embodiment, may reproduce high-resolution moving images, which includes all extended layers. However, when the circuit status is not desirable, a portion of the extended layers may be omitted, and cause the picture quality to decrease, but moving images may be reproduced in real-time instead of securing the base layer and first-priority extended layer. That is, even when using a combination of a transfer protocol such as TCP, which provides reliable transmission by retransmitting data, and the SVC method, moving images may be reproduced having various resolutions according to the circuit status. Thus, best-effort image data transmission may be ensured.

In addition, and in accordance with an exemplary embodiment, the reception device 202 may include the image feature setting unit 5 which sets features of image data, and the first-priority extended layer setting unit 6 which sets the first-priority extended layer which is an extended layer that needs to be retransmitted based on the image feature identified in the image feature setting unit 5. Therefore, because the reception device 202 may retransmit the extended layers according to the image data features, moving images, in which extended layers and a base layer have been included in the content images are combined, may always be reproduced regardless of the circuit status.

In accordance with an exemplary embodiment, because the first-priority extended layer is set according to the content image features, and not the circuit status, transmission of the extended layers appropriate for image data may always be protected. Therefore, the moving images may be reproduced at a more desirable resolution.

In accordance with an exemplary embodiment as disclosed above, in the event that the base layer and first-priority extended layer are all formed and the timeout period is finished, the reception completed packet processing unit 84 may order the retransmission process to stop. Alternatively, in accordance with another exemplary embodiment, regardless of whether the first-priority extended layer is formed or not, after the base layer reception completed time point and before the timeout period is finished, the reception completed packet processing unit 84 may transmit the dummy reception completed packets for the non-received transmitted image packets.

Furthermore, the frame detecting unit 85 may attempt to temporarily decode only a frame of the base layer. Further, the timer unit 86 may start counting the timeout period from the base layer reception completed time point, and informs the reception completed packet processing unit 84 that the timeout period is finished.

In accordance with an exemplary embodiment, the frame of the base layer may be protected, and may reproduce moving images with a minimum resolution. Also, because the transmission device 201 may continuously execute the retransmission process of the extended layers until the timeout period is finished, the extended layer may be formed, depending on the circuit status. That is, the reception device 202 may also provide the best-effort image data transmission based on the circuit status and the picture quality.

In accordance with one or more exemplary embodiments, the first-priority extended layer setting unit 6 may set one extended layer as the first-priority extended layer. Alternatively, in accordance with an exemplary embodiment, a plurality of extended layers may be set as the first-priority layer. Also, the first-priority extended layer setting unit 6 may prioritize the extended layers according to specified moving image features.

In accordance with one or more exemplary embodiments, image data photographed using the camera 13 may be sequentially encoded using the SVC method. Alternatively, in accordance with an exemplary embodiment, the image data may be encoded in advance using the SVC method, then stored in the image data storing unit 4, and thus be transmitted to the reception device 100.

Also, in accordance with one or more exemplary embodiments, even if an extended layer data having a resolution of 1920×1080 (full high resolution, hereinafter, referred to as "FHD") is transmitted, a reception device, having a display of a resolution of 640×480 (VGA), is not able to support the FHD extended layer data. In addition, although a decoding unit of the reception device may support up to a resolution of 1280×720 (720P), because the reception device may not be able to support the FHD extended layer data, the reception device and a transmission device may negotiate to exchange the maximum resolution or bit rates that may be supported by the reception device. Then, the transmission device may reduce the resolution or bit rates of the extended layer data to be less than the maximum supportable resolution or bit rates of the reception device. The method described in the one or more exemplary embodiments may be implemented even when the resolution or bit rates of the extended layer data is limited by using the transmission device.

In addition, the units described above may be installed as a new program in other transmission and reception devices to implement one or more functions of the discussed exemplary embodiments. Further, the SVC method of the image coding unit 3 is not limited to the exemplary embodiments described above. For example, the extended layers may be divided into more than three layers.

Therefore, in the data transmitting system according to one or more exemplary embodiments, even when transmitting stream-type data using TCP, when the circuit status is undesirable, only the preferred extended layers may be securely transmitted to the reception device, and moving images of various resolutions may be reproduced depending on the picture quality. Also, because the first-priority extended layer is set depending on the content image features stored in the image data, best-effort image data transmission may be ensured and at the same time, moving images may be reproduced in real-time and in high resolutions according to the features of the content images which store moving image data.

While the exemplary embodiments have been particularly shown and described, it will be understood by those of ordinary skill in the art that various changes in form and details may be made therein without departing from the spirit and scope of the present invention as defined by the following claims.

What is claimed is:

1. A reception device receiving an image packet, the reception device comprising:
    a frame detector that detects a base layer reception completed time point indicating a time at which a base layer of a frame to be reproduced is formed using the received image packet;
    a timer that detects an expiration of a timeout period beginning at the earliest from the base layer reception completed time point, wherein a portion of extended layers is received from a transmission device during the timeout period; and
    a reception completed packet processor that transmits to the transmission device a reception completed packet for a non-received image packet in response to detecting the expiration of the timeout period, wherein the non-received image packet is at least one of the extended layers that is not received after the expiration of the timeout period detected by the timer.

2. The reception device of claim 1, further comprising:
    a receiver that receives the image packet and sequence numbers from a transmission device;
    a layer identifier that identifies layers of the image packet received by the receiver, based on layer data; and
    a forward error corrector (FEC) that performs an FEC process in the event that the image packet received in the layer identifier has errors or omission.

3. The reception device of claim 1, wherein the timeout period ends before a reproducing timing of the frame that is to be reproduced.

4. The reception device of claim 1, further comprising:
    a first-priority extended layer setter that sets a first-priority extended layer to be retransmitted,
    wherein the frame detector detects the base layer reception completed time point, and a first-priority extended layer reception completed time point, indicating when the first-priority extended layer is formed, and
    wherein the timer informs the reception completed packet processor of the expiration of the timeout period, wherein the timeout period begins from a later of the base layer reception completed time point and the first-priority extended layer reception completed time point.

5. The reception device of claim 1, wherein the frame detector temporarily decodes at least one of the base layer and a first-priority extended layer by using the image packet received in a receiver, and set a success time point of the temporary decoding as at least one of the base layer reception completed time point and a first-priority extended layer reception completed time point.

6. The reception device of claim 1, wherein the reception completed packet processor transmits a dummy reception completed packet that instructs the transmission device to terminate retransmitting the non-received image packet, after being informed of the expiration of the timeout period.

7. The reception device of claim 1, wherein the reception completed packet processor transmits a dummy reception completed packet of the image packet that is not received, and that has a lower sequence number than highest sequence numbers of the received image packets to the transmission device, at a later of the base layer reception completed time point and a first-priority extended layer reception completed time point.

8. The reception device of claim 4, further comprising an image feature setter that sets an image feature of image data,
    wherein the first-priority extended layer setter sets the first-priority extended layer to be retransmitted according to the image feature set by the image feature setter.

9. A data transmitting system that transmits image data as stream-type data, comprising:
    a transmission device; and
    a reception device that receives an image packet from the transmission device,
    wherein the transmission device comprises:
        an image data storer that stores coded image data formed of a base layer, extended layers and layer data representing layers of the coded image data;
        a transmitter that generates the image packet including the coded image data and corresponding layer data, and that transmits the generated image packet to the reception device; and
        a retransmitter that receives, from the reception device, a reception completed packet that indicates the corresponding image packet was received in the reception device, and that retransmits the image packet for which the corresponding reception completed packet was not received,
    wherein the reception device comprises:
        a reception completed packet processor that transmits to the transmission device a reception completed packet for a non-received image packet in response to detecting an expiration of a timeout period;
        a receiver that receives the image packet and sequence numbers from the transmission device;

a layer identifier that identifies layers of the image packet received by the receiver, based on the layer data;

a frame detector that detects a base layer reception completed time point, indicating a time at which a base layer of a frame to be reproduced is formed using the received image packet; and a timer that detects expiration of the timeout period beginning, at the earliest, from the base layer reception completed time point, wherein a portion of extended layers is received from a transmission device during the timeout period, and wherein the non-received image packet is at least one of the extended layers that is not received the expiration of the timeout period from the timer.

10. The reception device of claim 9, wherein the timeout period ends before a reproducing timing of the frame that is to be reproduced.

11. The reception device of claim 9, further comprising:

a first-priority extended layer setter that sets a first priority extended layer to be retransmitted, wherein the frame detector detects the base layer reception completed time point, and a first-priority extended layer reception completed time point indicating when the first-priority extended layer is received;

wherein the timer informs the reception completed packet processor of the expiration of the timeout period, wherein the timeout period begins from a later of the base layer reception completed time point and first-priority extended layer reception completed time point.

12. The reception device of claim 9, wherein the frame detector temporarily decodes at least one of the base layer and a first-priority extended layer by using the image packet received in a receiver, and set a success time point of the temporary decoding as at least one of the base layer reception completed time point and a first-priority extended layer reception completed time point.

13. The reception device of claim 9, wherein the reception completed packet processor transmits a dummy reception completed packet of the image packet that is not received, and that has a lower sequence number than highest sequence numbers of the received image packets to the transmission device, at a later of the base layer reception completed time point and a first-priority extended layer reception completed time point.

14. The reception device of claim 11, further comprising:

an image feature setter that sets an image feature of image data, wherein the first-priority extended layer setter sets the first-priority extended layer to be retransmitted according to the image feature set by the image feature setter.

15. A data transmitting system that transmits image data as stream-type data, comprising:

a reception device that receives an image packets transmitted from a transmission device, wherein the transmission device comprises:

an image data storer that stores coded image data formed of a base layer, extended layers, and layer data representing layers of the coded image data;

a transmitter that generates the image packet including the coded image data and corresponding layer data, and that transmits the generated image packet to the reception device; and a retransmitter that receives, from the reception device, a reception completed packet that indicates the corresponding image packet was received in the reception device, and that retransmits the image packet for which the corresponding reception completed packet was not received, wherein the reception device comprises:

a reception completed packet processor that transmits to the transmission device a reception completed packet for a non-received image packet in response to detecting an expiration of a timeout period;

a receiver that receives the image packet and sequence numbers from the transmission device;

a layer identifier that identifies layers of the image packet received by the receiver, based on the layer data;

a frame detector that detects a base layer reception completed time point, indicating a time at which a base layer of a frame to be reproduced is received using the received image packet; and a timer that detects expiration of the timeout period beginning, at the earliest, from the base layer reception completed time point, wherein a portion of extended layers is received from a transmission device during the timeout period, and wherein the non-received image packet is at least one of the extended layers that is not received the expiration of the timeout period from the timer.

16. A method of receiving a moving image, the method comprising:

receiving image packets of a frame, the image packets comprising base layer image packets and extended layer image packets;

determining that reception of at least one of the base layer image packets and the extended layer image packets is complete, and that reception of another one of the base layer image packets and the extended layer image packets is partially complete;

starting a timer in response to determining reception of the at least one of the base layer image packets and the extended layer image packets is complete;

decoding the image packets into the base layer or the extended layer, corresponding to the at least one of the base layer image packets and the extended layer image packets, using the completely received image packets for the base layer or the extended layer, or the partially received image packets for the base layer or the extended layer along with newly received image packets from another frame; and transmitting to a source of the image packets, in response to expiration of the timer, a reception complete indicator for at least one of the extended layer image packets that is not received.

* * * * *